(12) United States Patent
Suzuki et al.

(10) Patent No.: US 12,446,590 B2
(45) Date of Patent: Oct. 21, 2025

(54) METHOD FOR PRODUCING ROASTED COFFEE BEANS AND ROASTED COFFEE BEANS

(71) Applicant: SUNTORY HOLDINGS LIMITED, Osaka (JP)

(72) Inventors: Tomonori Suzuki, Kanagawa (JP); Takao Takahashi, Kanagawa (JP); Morio Mitsuhashi, Kanagawa (JP); Koichiro Yamada, Kanagawa (JP); Harumichi Seta, Tokyo (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 171 days.

(21) Appl. No.: 18/015,900

(22) PCT Filed: Jul. 15, 2021

(86) PCT No.: PCT/JP2021/026598
§ 371 (c)(1),
(2) Date: Jan. 12, 2023

(87) PCT Pub. No.: WO2022/014671
PCT Pub. Date: Jan. 20, 2022

(65) Prior Publication Data
US 2023/0248013 A1 Aug. 10, 2023

(30) Foreign Application Priority Data

Jul. 16, 2020 (JP) .................... 2020-122392

(51) Int. Cl.
*A23F 5/04* (2006.01)
*A23F 5/26* (2006.01)

(52) U.S. Cl.
CPC . *A23F 5/04* (2013.01); *A23F 5/26* (2013.01)

(58) Field of Classification Search
CPC ..................................... A23F 5/04; A23F 5/26
See application file for complete search history.

(56) References Cited

U.S. PATENT DOCUMENTS

| 8,840,948 B2 | 9/2014 | Yamamoto et al. |
| 2018/0360064 A1 | 12/2018 | Elsby et al. |
| 2019/0208798 A1* | 7/2019 | Voges ....................... A23F 5/04 |

FOREIGN PATENT DOCUMENTS

| CN | 105494825 A | 4/2016 |
| CN | 111264660 A | 6/2020 |
| JP | 4-311349 A | 11/1992 |
| JP | 2000-300180 A | 10/2000 |

(Continued)

OTHER PUBLICATIONS

Translation for JP2018093741 published Jun. 21, 2018.*

(Continued)

*Primary Examiner* — Anthony J Weier
(74) *Attorney, Agent, or Firm* — WHDA, LLP

(57) ABSTRACT

Provided is a novel roasting method that is effective for improving the flavor of roasted coffee beans. The present invention provides a method for producing roasted coffee beans, including a step of roasting coffee beans, wherein a ratio of lightness (lightness ratio) of the coffee beans is 0.65 or more, and a temperature increasing rate of a roasting temperature is retained at −0.15° C./second to 0.15° C./second.

7 Claims, 1 Drawing Sheet

(56) References Cited

FOREIGN PATENT DOCUMENTS

| JP | 2003-274862 A | 9/2003 |
|---|---|---|
| JP | 2004-305167 A | 11/2004 |
| JP | 2018-93741 A | 6/2018 |
| JP | 2018-186736 A | 11/2018 |
| JP | 2018-536408 A | 12/2018 |

OTHER PUBLICATIONS

International Search Report dated Sep. 14, 2021, issued in counterpart International Application No. PCT/JP2021/026598. (3 pages).
"Basic Knowledge for Proper Roasting", Asahiya Mook Reference Book for the Roasting, Bach Kaffee Training Center, 2017, May 19, 2020, pp. 21-22, w/partial English Translation. Cited in ISR. (29 pages).
S. Rao, "What is Baked Coffee?", (Most Pros Don't Know!), Feb. 25, 2018, pp. 3. Cited in ISR. (17 pages).
"Coffee bean roasting test", Heat and roast time 01-Haze timing. Coffee Column-Coffee at Frank!, Feb. 27, 2017, pp. 4, w/partial English Translation. Cited in ISR. (8 pages).
"Roast Masters Championship", (2012), w/partial English Translation. (31 pages).
Extended (Supplementary) European Search Report dated Jul. 1, 2024, issued in counterpart application No. 21843225.0. (8 pages).

\* cited by examiner

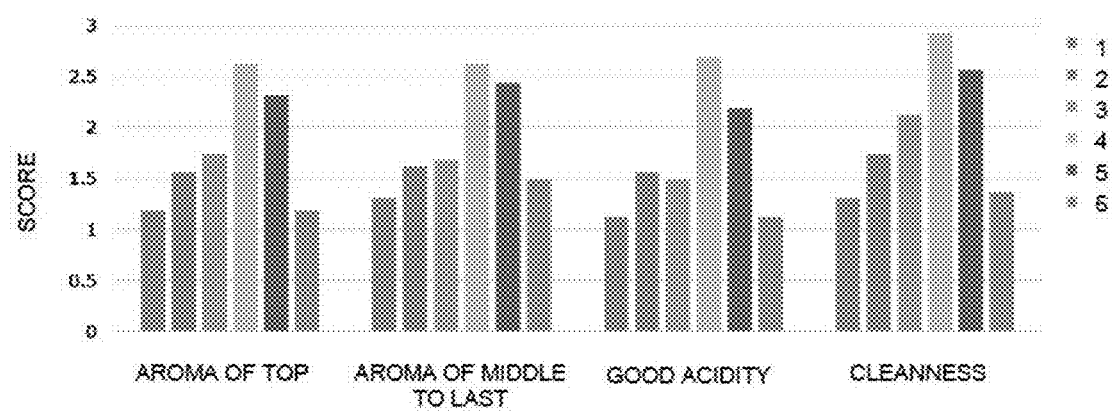

METHOD FOR PRODUCING ROASTED COFFEE BEANS AND ROASTED COFFEE BEANS

TECHNICAL FIELD

The present invention relates to a method for producing roasted coffee beans and roasted coffee beans obtained by the production method.

BACKGROUND ART

Coffee is one of the beverages that are widely familiar with people. There are a large number of coffee beverages distributed in the market, and their flavors are various. Roasted coffee beans are the main starting material for coffee beverages. Roasted coffee beans are obtained by roasting raw coffee beans. The roasting conditions determine the characteristics or quality of roasted coffee beans and therefore give an influence on the characteristics or quality of coffee beverages. Conventionally, attempts have been made to devise the conditions for roasting coffee beans for various purposes.

PTL 1 discloses that coffee beans obtained by rapid roasting conditions have an advantage of exhibiting high extraction efficiency but there is still room for improvements in generation of aromas or flavors characteristic of coffee. It has been reported that in order to address this problem, roasting is performed in two stages while using color during roasting or roasting temperature for coffee beans as an index, thereby enhancing methanethiol (methyl mercaptan) that contributes to the fresh aroma of roasted coffee beans.

PTL 2 discloses that long-term storage of a container-filled coffee beverage kept in a warm state obviously deteriorates a preferred flavor (bitterness and astringency peculiar to coffee, and preferred taste). Then, PTL 2 discloses providing a taste improver in order to address this problem. The taste improver is produced by a roasting method in which attention is payed to the following: the cumulative temperature from placing raw coffee beans into a roaster to the start of the second popping, the cumulative temperature from the start of the first popping to the start of the second popping, the roasting time from the start of the first popping to the finish of baking, and the roasting time from the placing of raw coffee beans to the finish of baking.

PTL 3 discloses a method for roasting coffee beans, and the method enables maintaining the flavor characteristics of coffee while reducing acrylamide generated by roasting of coffee beans. The roasting method includes a step of rapidly heating coffee beans at a high temperature increasing rate (20° C./minute to 40° C./minute) until the temperature of the coffee beans reaches 160° C.' to 220° C. and a step of gently heating the coffee beans at a low temperature increasing rate (1° C./minute to 10° C./minute).

CITATION LIST

Patent Literature

PTL 1: Japanese Patent Laid-Open No. 2000-300180
PTL 2: Japanese Patent Laid-Open No. 2018-186736
PTL 3: Japanese Translation of PCT International Application Publication No. 2018-536408

SUMMARY OF INVENTION

Technical Problem

An object of the present invention is to provide a novel roasting method that is effective for improving the flavor of roasted coffee beans.

Solution to Problem

The present inventors have conducted studies while taking notice of the relevance between the various conditions with regard to the roasting of coffee beans and the flavor of roasted coffee beans. As a result, the present inventors have found that the flavor of roasted coffee beans is improved by performing roasting while using a ratio of the lightness of coffee beans during the roasting to the lightness of the coffee beans before the roasting as an index. The present inventors have completed the present invention based on the finding.

The present invention provides the following. However, the present invention is not limited to the following.

(1) A method for producing roasted coffee beans, comprising
a step of roasting coffee beans, wherein a ratio of lightness of the coffee beans expressed by formula (I) below (lightness ratio) is 0.65 or more, and a temperature increasing rate of a roasting temperature is retained at −0.15° C./second to 0.15° C./second:

[Formula 1]

$$\text{Lightness ratio} = \frac{L_{T1}}{L_{T0}} \quad \text{Formula (I)}$$

wherein
T0: before starting roasting (0 seconds); T1: time (seconds) after starting roasting, provided that T1>0;
$L_{T0}$: the lightness of the coffee beans at T0; and
$L_{T1}$: the lightness of the coffee beans at T1.
(2) The method for producing roasted coffee beans according to (1), wherein the temperature increasing rate is retained for 60 seconds to 720 seconds.
(3) The method for producing roasted coffee beans according to (1) or (2), wherein the temperature increasing rate is retained for 60 seconds to 720 seconds, and thereafter the temperature increasing rate is retained at 0.2° C./second or more.
(4) The method for producing roasted coffee beans according to any one of (1) to (3), wherein the lightness ratio is 0.8 or more.
(5) The method for producing roasted coffee beans according to any one of (1) to (4), wherein raw coffee beans are subjected to the roasting step.
(6) Roasted coffee beans obtained by the method according to any one of (1) to (5).
(7) A method for producing a coffee extract, comprising subjecting the roasted coffee beans according to (6) to extraction with a solvent.
(8) A coffee extract obtained by the method according to (7).
(9) A coffee product comprising the coffee extract according to (8).

BRIEF DESCRIPTION OF DRAWINGS

FIG. 1 shows results of sensory evaluations for respective samples (1 to 6). Each of the aroma of the top, the aroma of the middle to the last, the acidity of good-quality, and the cleanness was scored. 1: Comparative Example 1, 2: Example 1, 3: Example 2, 4: Example 3, 5: Example 4, 6: Comparative Example 2.

DESCRIPTION OF EMBODIMENTS

When a numerical range is mentioned herein, the numerical range includes the endpoints of the upper limit value and/or the lower limit value unless otherwise noted. For example, the recitation "a temperature increasing rate of −0.15° C./second to 0.15° C./second" includes −0.15° C./second and 0.15° C./second.

<Method for Producing Roasted Coffee Beans>

A method for producing roasted coffee beans is provided by the present invention. The production method includes a step of roasting coffee beans. The coffee beans to be subjected to the roasting step may be any kind of coffee beans. With regard to the coffee beans, for example, the variety (such as *arabica* species and *canephora* species), production area, storage period, and grade are not particularly limited. In addition, the procurement means for the coffee beans is also not particularly limited. A person skilled in the art can appropriately select these. The coffee beans to be subjected to the roasting step may be any of raw beans and roasted beans, but raw coffee beans are preferably used. Further, the amount of the coffee beans to be roasted can appropriately be set according to the scale of production, the necessary amount of products (roasted coffee beans), and the like.

Roasting of coffee beans can be roughly classified into three types (direct heat type, hot air type, and semi-hot air type) depending on the difference in the roasting means. The direct heat type is a method involving roasting by directly applying fire to coffee beans. The hot air type is a method involving roasting by applying hot air to coffee beans. The semi-hot air type is an intermediate method between the direct heat type and the hot air type. In the present invention, the roasting may be performed by any of the methods. Then, the roasting of coffee beans can be performed using a roaster. The roaster is convenient for producing roasted coffee beans in large quantities and efficiently. In addition, the roaster preferably includes control means of the roasting temperature. The roaster may be one commercially available, or may be one individually designed so that it can be applicable to a specific embodiment of use.

A roasting chamber may be preheated before starting the step of roasting the coffee beans. The "roasting chamber" as used herein means a place or space where the roasting of the coffee beans is performed.

In the step of roasting the coffee beans, the temperature at the start can arbitrarily be set. The roasting can be started at 100° C. to 300° C., but the temperature is not limited thereto. In the roasting step, the roasting temperature is controlled while using a ratio of the lightness (also referred to as "lightness ratio") of the coffee beans as an index. Here, the lightness ratio is a ratio of the lightness of the coffee beans at a certain point in time after starting the roasting to the lightness of the coffee beans before starting the roasting (that is, at a roasting time of 0 seconds). Then, the lightness of the coffee beans is an extent of the roasting of the coffee beans expressed by the brightness of color. In more detail, the lightness of the coffee beans becomes lower as the extent of the roasting becomes higher. The lightness of the coffee beans can be represented by a colorlette value, an L value, and the like, but the measure for representing the lightness is not limited thereto. The lightness ratio can be expressed by formula (I) below.

[Formula 2]

$$\text{Lightness ratio} = \frac{L_{T1}}{L_{T0}} \quad \text{Formula (I)}$$

wherein

T0: before starting roasting (0 seconds)

T1: time (seconds) after starting roasting, provided that T1>0

$L_{T0}$: lightness of coffee beans at T0

$L_{T1}$: lightness of coffee beans at T1

Hereinafter, description will be given for an exemplary case where the L value is used as the lightness. A person skilled in the art understands that the present invention is feasible even if the L value in the following description is replaced by another measure of the lightness (such as colorlette). The L value of the coffee beans represents the extent of roasting of the coffee beans (also referred to as degree of roasting) as a color. The L value of white is defined as 100 and the L value of black is defined as 0. Accordingly, a smaller L value means that the roasting of the coffee beans has progressed more, and that the degree of roasting is higher. Then, it can also be understood that the L value ($L_{T1}$) of the coffee beans at a certain point in time after starting the roasting is equal to or lower than the L value ($L_{T0}$) of the coffee beans before starting the roasting. However, at an early stage of the roasting, the $L_{T1}$ value may be higher than the $L_{T0}$ value in some cases, although only slightly higher than the $L_{T0}$ value. It is presumed that this is because when the water in the raw beans evaporates at an early stage of the roasting, tone of color may become light in some cases. The L value ($L_{T0}$) of the coffee beans before starting roasting is generally, but not limited to, about 50 to about 80, or about 65 to about 70. The L value of the coffee beans can be measured with a color-difference meter. Generally, the coffee beans are pulverized and the L value of the pulverized coffee beans is measured. However, when a particular measurement method is shown in instructions for use or the like of a device, the L value may be measured according to the measurement method. A known pulverizer or grinder can be used in pulverization. Herein, the L value is measured by the method unless otherwise noted.

In the roasting step, the temperature increasing rate (first temperature increasing rate) of the roasting temperature is retained in a particular range (first temperature condition) before the L value ratio ($L_{T1}/L_{T0}$) becomes lower than a particular value. Such an L value ratio may be 0.65 or more, and is preferably 0.8 or more. If the retention of the temperature increasing rate of the roasting temperature is started without satisfying the requirement of an L value ratio of 0.65 or more, the effect of improving the flavor of the roasted coffee beans is not obtained sufficiently. The coffee beans are sampled after starting the roasting to measure the L value of the coffee beans, and the L value ratio can thus be obtained. Alternatively, the change in the L value during the roasting is grasped in advance by a preliminary study, and in this case, the retention of the temperature increasing rate can be started at a desired lightness ratio without sampling the coffee beans after starting the roasting.

Then, the temperature increasing rate (first temperature increasing rate) of the roasting temperature may be a rate such that the roasting temperature is substantially kept or gently increased. For example, the temperature increasing rate is −0.15° C./second to 0.15° C./second, preferably −0.1° C./second to 0.1° C./second, more preferably −0.05° C./second to 0.05° C./second, and still more preferably 0° C./second to 0.05° C./second. When the temperature increasing rate of the roasting temperature is not retained in this range, the effect of improving the flavor of the roasted coffee beans may not be obtained sufficiently in some cases. The retention time of the temperature increasing rate (first temperature increasing rate) of the roasting temperature is 60 seconds to 720 seconds, and preferably 120 seconds to 600 seconds. As used herein, the "roasting temperature" refers to a temperature in the roasting chamber. The roasting temperature can be measured by known means, such as a thermometer or a temperature sensor. The temperature increasing rate can be controlled based on the roasting temperature measured in this manner.

Further, the coffee beans can be roasted under a changed temperature condition (under the second temperature condition) after the coffee beans are roasted under the condition (first temperature condition) in which the temperature increasing rate (first temperature increasing rate) of the roasting temperature is retained in the manner as described above. In the second temperature condition, the temperature increasing rate can be changed (second temperature increasing rate). Such a temperature increasing rate (second temperature increasing rate) may be set to be higher than the first temperature increasing rate. For example, the second temperature increasing rate may be retained at 0.2° C./second or more, and is preferably retained at 0.4° C./second or more. A person skilled in the art understands that there is an upper limit in the allowable temperature increasing rate because of the relationship with the environment surrounding the site where the roasting is performed (the roasting method, the capability of the roaster, and other conditions). Accordingly, a person skilled in the art can understand and appropriately set the upper limit of the temperature increasing rate without any particular explanation.

Besides, the method of the present invention may further include a known step in the related art in addition to the above-described steps. For example, a step of stopping the roasting of the coffee beans can be performed. The step is known as a cooling step. By the cooling step, the temperature of the roasted coffee beans is lowered to prevent progress of the roasting. Means for lowering the temperature of the roasted coffee beans is not particularly limited. The means can be performed by, for example, bringing the roasted coffee beans into contact with water, air, a combination thereof, or the like. By the cooling step, the temperature of the roasted coffee beans can be lowered to, for example, 60° C. or less or 50° C. or less, and finally cooled to room temperature.

The present invention is also directed to the roasted coffee beans which are obtained by the above-described production method. The roasted coffee beans may have an L value of 30 to 10, preferably 25 to 15, but the L value is not limited thereto. In the roasted coffee beans of the present invention, the flavor can be improved. The roasted coffee beans have more improved flavor than roasted coffee beans obtained by an ordinary roasting method (a method in which the roasting temperature is increased at an approximately constant temperature increasing rate through the whole roasting step). As used herein, the flavor is evaluated in terms of the aroma of the top, the aroma of the middle to the last, the acidity of good-quality, and the cleanness as indexes. Here, the cleanness refers to having little off-flavor (due to negative aroma and/or negative taste (such as harshness and bitterness)). Sensory evaluations can be performed according to the methods described in Examples below on the aroma of the top, the aroma of the middle to the last, the acidity of good-quality, and the cleanness.

<Method for Producing Coffee Extract, Coffee Product, and the Like>>

The present invention provides a method for producing a coffee extract. The production method includes a step of subjecting the above-described roasted coffee beans of the present invention to extraction with a solvent. Here, a step of pulverizing the roasted coffee beans may be performed before the extraction step. Examples of the solvent which is used for the extraction include water, a buffer solution (such as a phosphate buffer solution and a citrate buffer solution) and an organic solvent (such as an alcohol). The solvent is preferably water, but not limited thereto. Then, the production method may further include a known step in addition to the extraction step. For example, at least one step selected from the group consisting of diluting, concentrating, drying, molding, mixing, adjusting pH of the extraction liquid, adding another component, and the like can follow the extraction step. A person skilled in the art can appropriately adopt these known steps according to the final form in which the extract should be, the specifications, or the like.

The present invention is also directed to coffee extract obtained by the above-described production method. The coffee extract may be in any form of liquid, solid, semisolid, and the like. Examples of the liquid extract include, but not limited to, a solvent extract liquid of roasted coffee beans, and a diluted liquid or concentrated liquid of the extract liquid. A preferred embodiment is an aqueous extract liquid of roasted coffee beans. Examples of the solid extract include a frozen product, a powder, a granule, a capsule, and a tablet. Examples of the semisolid extract include a paste and a gel.

The present invention further provides a coffee product containing the above-described coffee extract. The coffee product can contain other components. Examples of other components include, but not limited to, a pH adjusting agent, a sweetener, an acidulant, a preservative, and an emulsifier. The coffee product can be filled in a container. Examples of the container include, but not limited to, a can (made of steel, aluminum, or the like), a bottle (made of plastic, glass, or the like), and a pack (such as paper).

It can be understood that the coffee extract or coffee product of the present invention can achieve an improvement in flavor as described for the roasted coffee beans mentioned above. Specifically, the aroma of the top, the aroma of the middle to the last, the acidity of good-quality, and the cleanness have been improved more in the coffee extract or coffee product of the present invention than in ordinary coffee extracts or coffee products. Here, the ordinary coffee extracts or coffee products means extracts of roasted coffee beans or coffee products containing the extracts, the extracts or coffee products obtained by ordinary methods (which mean methods in which the roasting temperature is increased at an almost constant temperature increasing rate through the whole roasting step).

EXAMPLES

Hereinafter, the invention will be described in more detail by way of Examples. However, the present Examples are provided for the purpose of understanding the invention and do not intend to limit the scope of the invention.

Examples 1 to 4

<Roasting Coffee Beans>

A hot air type roaster (manufactured by NEUHAUS NEOTEC Maschinen-und Anlagenbau GmbH) was used, the inside of the roasting pot was retained at 135° C. for 1 minute or more to perform warm-up operation, and thereafter raw coffee beans made in Brazil (*arabica* species, L value 67.6) were placed therein. After the coffee beans were placed, the beans were roasted at a temperature increasing rate of 0.2° C./second, and the temperature condition was set to the first temperature condition as shown in Table 1 at a point in time when the lightness ratio (the ratio of the lightness ($L_{T1}$) of the coffee beans at time $T_1$ after starting the roasting to the L value ($L_{T0}$) of the coffee beans before starting the roasting, $L_{T1}/L_{T0}$) reached the value shown in Table 1. Subsequently, the temperature condition was set to the second temperature condition, and the roasting was ended at a point in time when the final lightness ratio reached 0.3, thereby obtaining roasted coffee beans (samples 2 to 6). Note that, after raw coffee beans were placed in the roaster, the raw coffee beans was roasted at a constant temperature increasing rate (0.2° C./second) to obtain roasted beans (sample 1), which was used as Comparative Example 1.

TABLE 1

| Sample | Timing of starting retention Lightness ratio ($L_{T1}/L_{T0}$) | First temperature condition First temperature increasing rate (° C./second) | Retention time (minutes) | Second temperature condition Second temperature increasing rate (° C./second) | Final lightness ratio | Final L value |
|---|---|---|---|---|---|---|
| 1 | The temperature was increased at a constant rate (0.2° C./second) from the time when the temperature reached the lowest point after starting the roasting to the end of the roasting | | | | 0.3 | 22.6 |
| 2 | 1.1 | 0.0 | 4 | 0.2 | 0.3 | 22.2 |
| 3 | 1.1 | 0.0 | 8 | 0.2 | 0.3 | 22.4 |
| 4 | 1.1 | 0.0 | 4 | 0.4 | 0.3 | 23.9 |
| 5 | 0.8 | 0.0 | 4 | 0.4 | 0.3 | 24.7 |
| 6 | 0.6 | 0.0 | 4 | 0.4 | 0.3 | 23.2 |

1: Comparative Example 1, 2: Example 1, 3: Example 2, 4: Example 3, 5: Example 4, 6: Comparative Example 2

The L value for calculating the lightness ratio was measured according to the following procedure. The coffee beans sampled before starting the roasting step and during the roasting step were ground with a coffee grinder (ZM 200/manufactured by Retsch GmbH), and thereafter the L value was measured using a lightness measuring machine (Colorette 4/manufactured by PROBAT AG).

The following tests were performed by using the roasted coffee beans thus obtained.

<Sensory Evaluation>

Coffee extract liquids were obtained under the conditions shown below from the roasted coffee beans obtained above. The coffee extract liquids were used as samples for sensory evaluation.

Amount of roasted coffee beans used: 30 g
Ground roasted coffee beans
    KALITA Electric Coffee mill High Cut Mill 61005 (KALITA CO., LTD.) Grinding dial setting: 7
Extraction conditions
    Extractor: HARIO Smart Seven Coffee Maker V60 Auto Pour Over EVS-70B (HARIO CO., LTD.)
    Temperature of hot water: 90° C.
    Extraction time: 6 minutes and 19 seconds
    Amount of hot water supplied: 350 mL Six trained professional panelists reconciled the evaluation criteria and then evaluated each of the indexes described below on a three-point scale. An average was calculated for the rating given by the respective panelists and used as the sensory evaluation result.

Three-point scale
1: Not felt
2: Felt
3: Strongly felt

Sensory evaluation items
Aroma of top: An aroma that is felt at the moment the sample is put into a mouth
Aroma of middle to last: An aroma that is felt in the aftertaste after putting the sample into a mouth
Good acidity: Bright acidity like fruit
Cleanness: Having no off-flavor and the like due to scorched flavor, harshness, and bitterness

TABLE 2

| Sample | Aroma of top | Aroma of middle to last | Good acidity | Cleanness | Comment |
|---|---|---|---|---|---|
| 1 (Comp. Ex. 1) | 1.2 | 1.3 | 1.1 | 1.3 | The aromas are weak, and off-favor is felt |
| 2 (Ex. 1) | 1.6 | 1.6 | 1.5 | 1.8 | The cleanness is enhanced, and the aroma of top is also felt |
| 3 (Ex. 2) | 1.8 | 1.7 | 1.5 | 2.1 | Close to sample 2, but the aromas are felt more than in sample 2 |
| 4 (Ex. 3) | 2.6 | 2.6 | 2.7 | 2.9 | The aftertaste is felt most; and the cleanness is high Bright acidity is felt |
| 5 (Ex. 4) | 2.3 | 2.4 | 2.2 | 2.6 | Characteristics are close to sample 4 Strong and sustainable aromas and soft acidity are felt |
| 6 (Comp. Ex. 2) | 1.2 | 1.5 | 1.2 | 1.4 | The harshness is strong, and the aromas are weak Unfavorable bitterness continues to remain |

1: Comparative Example 1,
2: Example 1,
3: Example 2,
4: Example 3,
5: Example 4,
6: Comparative Example 2

Samples 2 to 5 (Examples 1 to 4) were more highly rated for all the items (the aroma of the top, the aroma of the middle to the last, the acidity of good-quality, and the cleanness) when compared to samples 1 and 6 (Comparative Examples 1 and 2).

Samples 2 to 5 were obtained by the method in which roasting was performed in such a way that a particular lightness ratio (0.65 or more) was used as an index in the roasting step to perform roasting under the first temperature condition (a gentle temperature increasing rate) followed by roasting under the second temperature condition (a higher temperature increasing rate). On the other hand, sample 1 was obtained by the method in which the roasting under the first temperature condition was not performed. Further, sample 6 was obtained by the method in which roasting was performed under the first temperature condition at a point in time when the lightness ratio became 0.6. From these, it can be understood that using a particular lightness ratio (0.65 or more) as an index in the roasting step to perform roasting under the first temperature condition (temperature increasing rate: −0.15° C./second to 0.15° C./second) followed by roasting under the second temperature condition (temperature increasing rate: 0.2° C./second or more) was effective for improving the flavor of the roasted coffee beans and the coffee extract liquids.

Then, from the comparison of the sensory evaluation results for sample 2 and sample 3, it was shown that when the retention time of the first temperature increasing rate is longer (about 8 minutes (480 seconds)), the flavor can be improved more effectively. From the comparison of the sensory evaluation results for sample 2 and sample 4, it was shown that by increasing the second temperature increasing rate, the flavor can be improved father more effectively.

In addition, from the comparison of the pencory evaluation results for sample 4 and sample 5, it was shown that by starting the routing under the first temperature condition at a point in time when the lightness ratio is high, the flavor can be improved more effectively.

The invention claimed is:

1. A method for producing roasted coffee beans, comprising
a step of roasting coffee beans, wherein before a ratio of lightness of the coffee beans expressed by formula (I) below (lightness ratio) becomes lower than 0.65 a temperature increasing rate of a roasting temperature is retained at −0.15° C./second to 0.15° C./second for 120 seconds to 720 seconds, and thereafter the temperature increasing rate is retained at 0.4° C./second or more:

[Formula 1]

$$\text{Lightness ratio} = \frac{L_{T1}}{L_{T0}} \quad \text{Formula (I)}$$

wherein
T0: before starting roasting (0 seconds);
T1: time (seconds) after starting roasting, provided that T1>0;
$L_{T0}$: the lightness of the coffee beans at T0; and
$L_{T1}$: the lightness of the coffee beans at T1.

2. The method for producing roasted coffee beans according to claim 1, wherein before the ratio of lightness of the coffee beans becomes lower than 0.8, the temperature increasing rate is retained at −0.15° C./second to 0.15° C./second for 120 seconds to 720 seconds, and thereafter the temperature increasing rate is retained at 0.4° C./second or more.

3. The method for producing roasted coffee beans according to claim 1, wherein raw coffee beans are subjected to the roasting step.

4. A method for producing a coffee extract, comprising subjecting the roasted coffee beans obtained by the method according to claim 1 to extraction with a solvent.

5. The method for producing roasted coffee beans according to claim 1, wherein the roasted coffee beans obtained have L value of 30 to 10.

6. The method according to claim 4, wherein the solvent is selected from the group consisting of water, a buffer solution, and an organic solvent.

7. A method for producing a coffee product comprising mixing the coffee extract obtained by the method according to claim 4 with other component selected from the group consisting of a pH adjusting agent, a sweetener, an acidulant, a preservative, and an emulsifier.

* * * * *